US006425930B1

(12) United States Patent
Wake et al.

(10) Patent No.: US 6,425,930 B1
(45) Date of Patent: Jul. 30, 2002

(54) AIR CLEANER WITH SELF-MOUNTED INLET SHROUD SEAL

(75) Inventors: Jon S. Wake, Verona; Donald E. Stiemke, Madison; Mark V. Holzmann, Stoughton, all of WI (US); Michael J. Mikolichek, Mayer, MN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/653,594

(22) Filed: Aug. 31, 2000

(51) Int. Cl.[7] .............................................. B01D 46/10
(52) U.S. Cl. ..................... 55/385.3; 55/498; 55/502; 123/198 E
(58) Field of Search .................. 55/385.1, 385.3, 55/498, 502; 123/198 E

(56) References Cited

U.S. PATENT DOCUMENTS

| 4,341,187 A | * | 7/1982 | Absenger | 123/198 E |
| 4,619,343 A | * | 10/1986 | Lengenfelder | 123/198 E |
| 4,653,457 A | * | 3/1987 | Stege | 55/DIG. 28 |
| 4,860,703 A | * | 8/1989 | Boda et al. | 123/198 E |
| 5,125,960 A | * | 6/1992 | Stanhope et al. | 123/198 E |
| 5,472,463 A | * | 12/1995 | Herman et al. | 123/198 E |
| 5,649,510 A | * | 7/1997 | Linze | 123/198 E |
| 5,649,986 A | * | 7/1997 | Mueller | 123/198 E |
| 5,755,842 A | * | 5/1998 | Patel et al. | 55/385.3 |
| 5,800,581 A | * | 9/1998 | Gielink et al. | 55/385.3 |
| 6,167,862 B1 | * | 1/2001 | Powell et al. | 123/198 E |
| 6,179,889 B1 | * | 1/2001 | Liu | 55/DIG. 2 |

* cited by examiner

*Primary Examiner*—David A. Simmons
*Assistant Examiner*—Minh-Chau T. Pham
(74) *Attorney, Agent, or Firm*—Jeffrey P. Calfa; Neil T. Powell; Dennis Kelly Sullivan

(57) ABSTRACT

An underhood air cleaner (20) for a vehicle (22) has an inlet shroud seal (72) self-mounted to the filter housing (60) at the filter inlet (68) and engaging the hood (28) at the exit opening (36) of the hood air channel (30). The self-mounting is accomplished without extra parts or fasteners such as bolts and clamps. Both axial (198) and radial (200) retention is provided for the shroud seal (72) on the filter housing (60), as well as reduced inflow restriction.

30 Claims, 5 Drawing Sheets

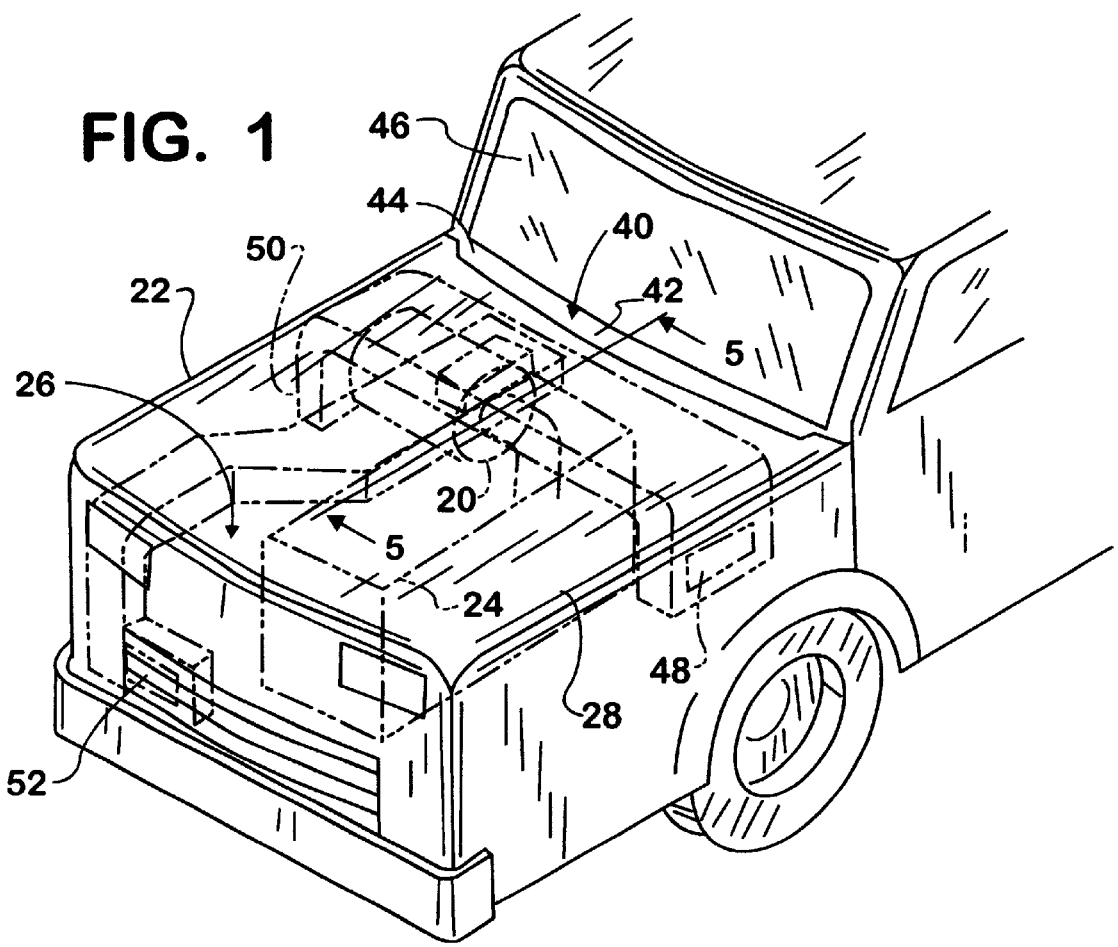
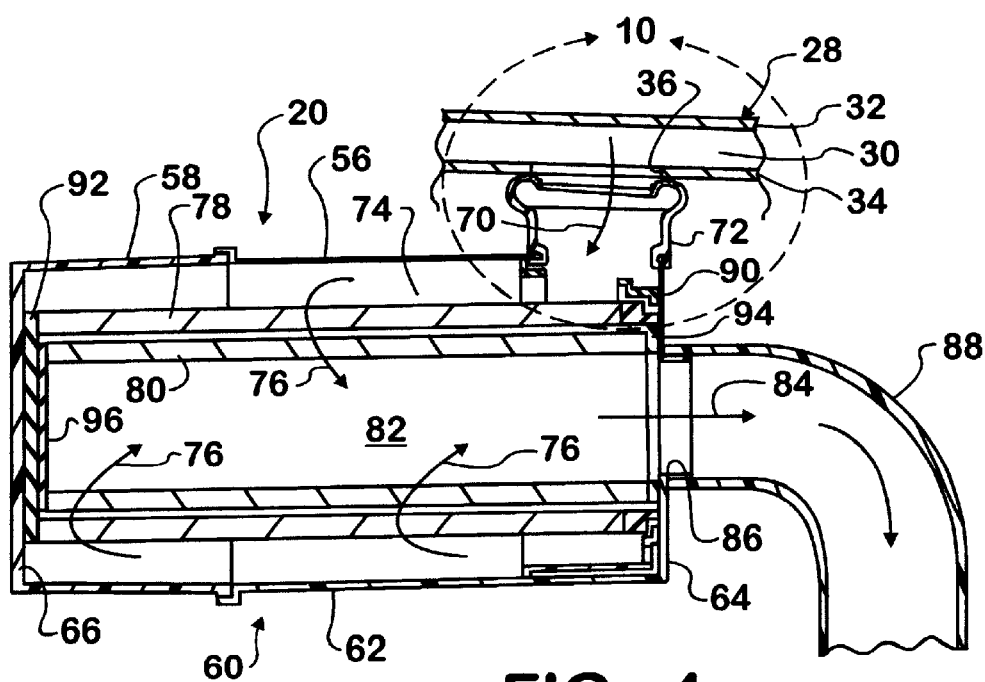

FIG. 10
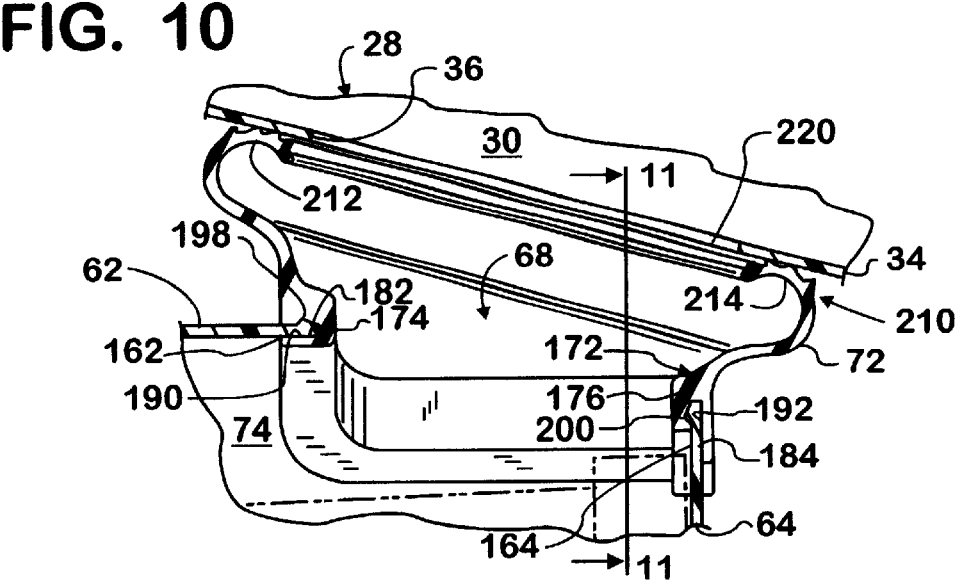
FIG. 11
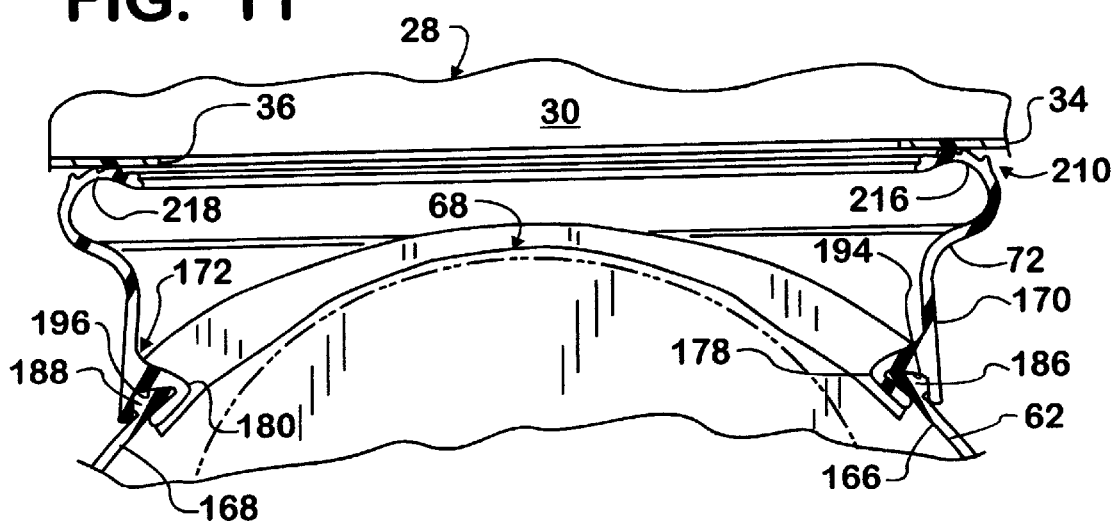
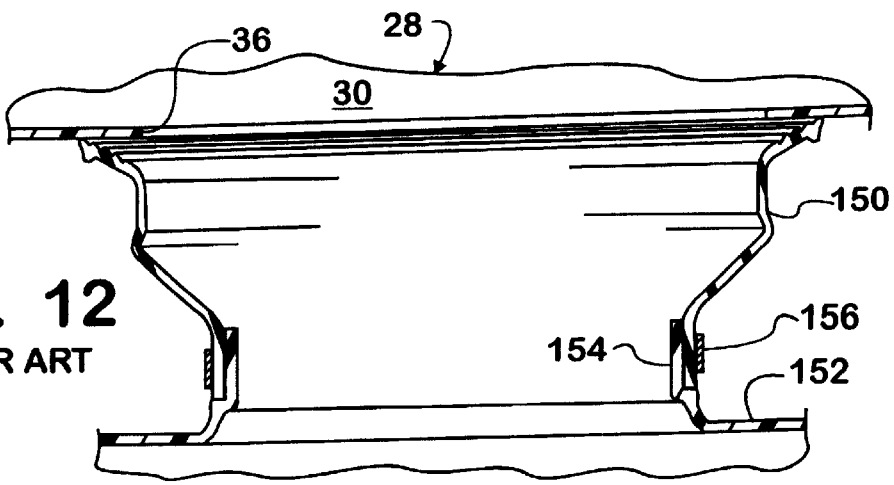
FIG. 12
PRIOR ART

AIR CLEANER WITH SELF-MOUNTED INLET SHROUD SEAL

BACKGROUND AND SUMMARY

The invention relates to air cleaners, including air cleaners for vehicles having an internal combustion engine in an engine compartment covered by a hood.

The invention arose during development efforts directed toward inlet shroud seals for underhood air cleaners. It is known in the prior art to provide a resilient inlet shroud seal for an underhood air cleaner engaging the vehicle hood at an air channel exit opening for directing air from the air channel through the exit opening into the filter housing inlet. Such shroud seals require extra parts or fasteners to mount the shroud seal to the filter housing, such as bolts and clamps.

The present invention provides an inlet shroud seal self-mounted to the filter housing without extra parts or fasteners. The invention also provides both axial and radial insertion and retention of the shroud seal on the housing for improved mounting. In one aspect, a low profile inlet shroud hood seal is provided and enables a straighter flow path into the air cleaner, reducing restriction. The low profile is desired in new generation truck designs having lower hood lines, which in turn reduces underhood space for engine components such as vertically extensive shroud seal inlet bellows and fastener components therefor. For example, an air cleaner with a tubular inlet pipe having an inlet shroud seal bellows attached thereto by a hose clamp requires a minimum length of engagement in order to provide secure attachment and also allow room for the hose clamp itself. The present invention address and solves this problem.

BRIEF DESCRIPTION OF THE DRAWINGS

FIG. 1 is a perspective view of a vehicle having an underhood air cleaner in accordance with the invention.

FIG. 4 is a sectional view taken along line 4—4 of FIG. 2.

FIG. 10 is an enlarged view of a portion of FIG. 4 at section 10—10.

FIG. 11 is a sectional view taken along line 11—11 of FIG. 10.

FIG. 12 is a view like FIG. 10 and shows prior art.

DETAILED DESCRIPTION

Figure 2:
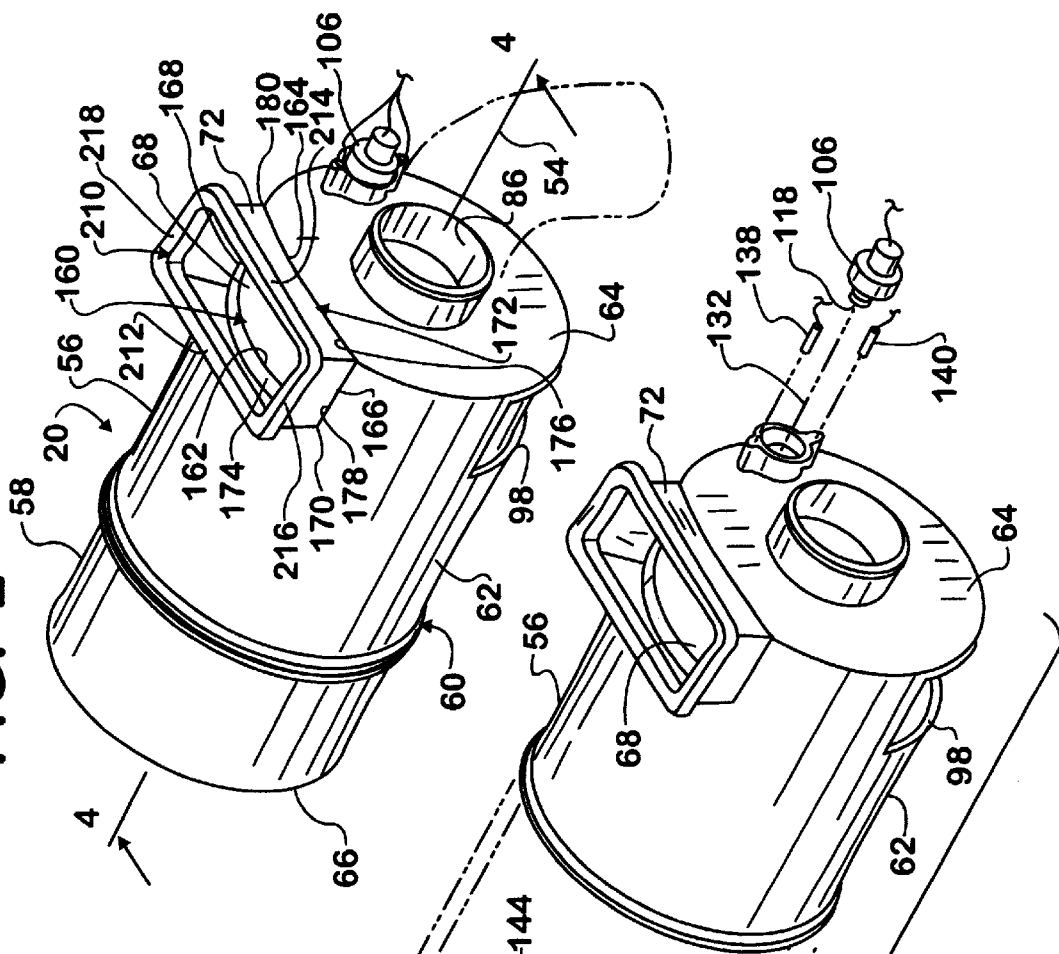
FIG. 2 is a perspective view of the air cleaner of FIG. 1.

FIGS. 1–4 show an underhood air cleaner 20 for a vehicle 22 operating in snowy conditions, for example having a snowplow (not shown). The vehicle has an internal combustion engine 24 in an engine compartment 26 covered by a hood 28. The hood has an air channel 30 therethrough, FIG. 4, formed between upper and lower panels 32 and 34, with the lower panel having an exit opening 36 facing into engine compartment 26. Incoming dirty air from outside of hood 28 is supplied into channel 30 as shown at arrow 38 in FIG. 5 through an area or gap 40 between the rear end 42 of hood 28 and the base 44 of windshield 46. Alternatively or additionally, air is supplied into channel 30 through side duct openings such as 48, 50, FIG. 1, and/or one or more front duct openings such as 52. The duct openings are typically covered by screens or louvers. Further alternatively, an opening may be provided in top panel 32 aligned or non-aligned with opening 36 in bottom panel 34. Further alternatively, the hood may comprise only a single panel member with an opening therethrough to supply incoming dirty air to the air cleaner from outside of the hood.

Air cleaner 20 is typically a cylindrical member extending axially along an axis 54, FIG. 2, though other shapes are possible. The air cleaner includes a base 56 having a cover 58 mounted thereto in standard manner, e.g. by bolts, overcenter clamps, bayonet couplings, or the like, to provide in assembled condition a cylindrical filter housing 60 having a cylindrical sidewall 62 extending axially along axis 54 between axially distally opposite endwalls 64 and 66. Sidewall 62 has a first or primary inlet opening 68 therethrough for receiving incoming dirty air from hood channel 30 as shown at arrow 70, FIGS. 4, 5. A resilient inlet shroud seal 72 is mounted to the filter housing at inlet 68 and engages hood 28 at exit opening 36 for directing air from channel 30 through exit opening 36 into inlet 68 of the filter housing. The incoming air flows into annular space 74, FIG. 4, then radially inwardly as shown at arrows 76 through primary or main filter element 78 then through safety filter element 80 into hollow interior 82, and then the clean filtered air flows axially rightwardly as shown at arrow 84 through outlet opening 86 in endwall 64, and then through conduit 88 supplying combustion air to the engine. Primary filter element 78 is typically pleated filter media formed in an annulus and potted between resilient compressible elastomeric end caps 90 and 92 as is known. End cap 92 spans and closes the left axial end of primary filter element 78. End cap 90 is axially and/or radially sealingly compressed in the housing. Safety filter element 80 is typically pleated or unpleated filter media potted between resilient compressible elastomeric end caps 94 and 96 in known manner. End cap 96 spans and closes the left axial end of safety filter element 80. End cap 94 is axially and/or radially sealingly compressed in the housing.

Figure 5:
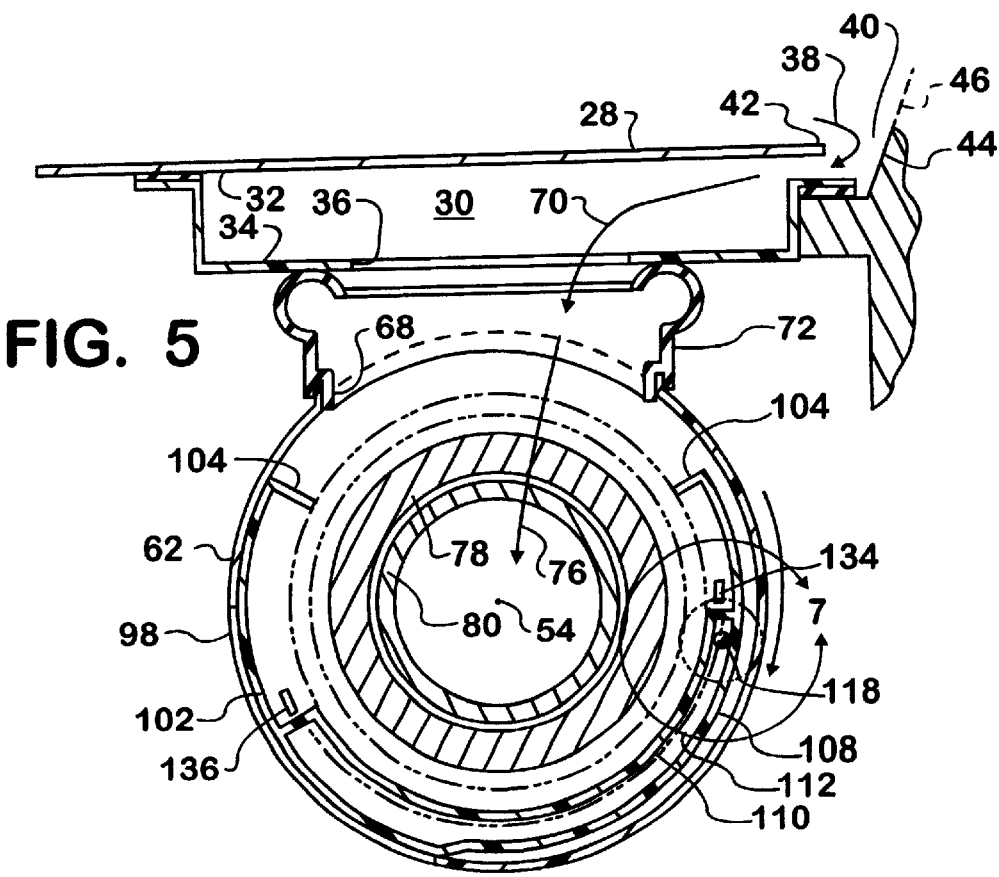
FIG. 5 is a sectional view taken along line 5—5 of FIG. 1.
Figure 6:
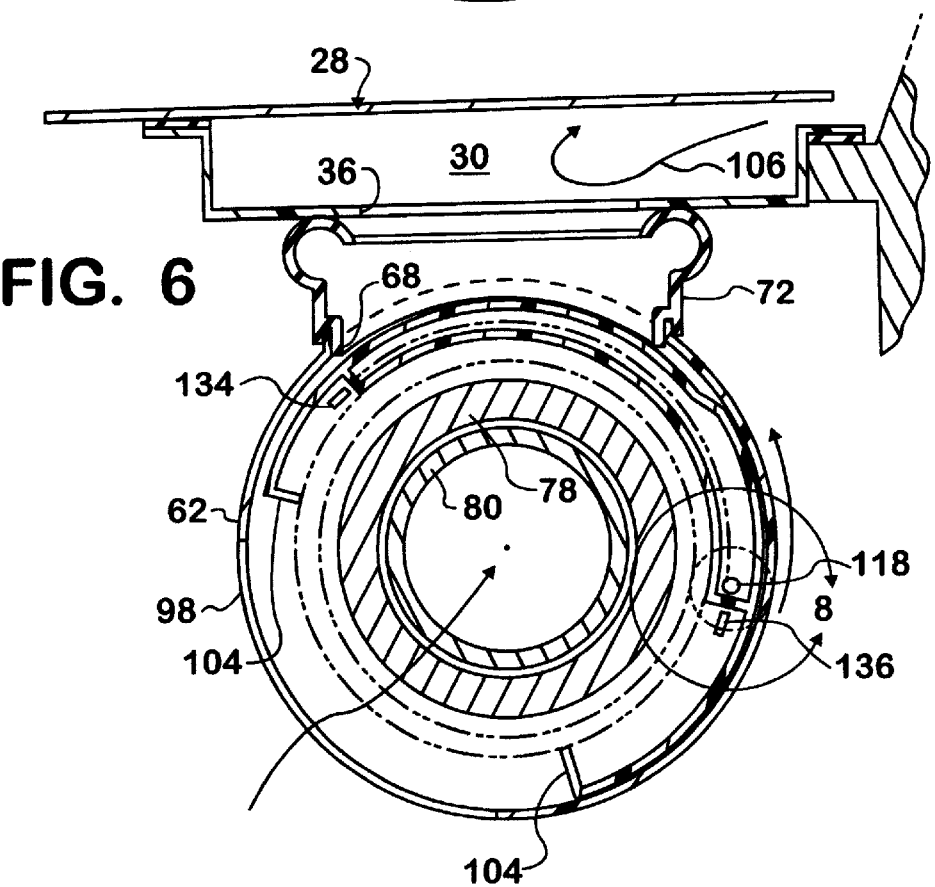
FIG. 6 is a view like FIG. 5 and shows an alternate condition.

Filter housing sidewall 62 has a second inlet opening 98 therethrough, FIGS. 2, 3, 5, 6. Second inlet opening 98 is circumferentially spaced from first inlet opening 68. A cylindrical sleeve valve 100, FIG. 3, has a cylindrical sidewall 102 adjacent and circumscribed by cylindrical sidewall 62 of housing 60. Sidewall 102 of sleeve valve 100 has an arcuate opening 104. A rotary actuator 106, FIG. 3, preferably provided by an electric motor, rotates sleeve valve 100 about axis 54 between: a first position, FIG. 5, radially aligning arcuate opening 104 in sidewall 102 of sleeve valve 100 with first inlet opening 68 in sidewall 62 of housing 60; and a second position, FIG. 6, radially aligning arcuate opening 104 in sidewall 102 of sleeve valve 100 with second inlet opening 98 in sidewall 62 of housing 60. In the noted first position as shown in FIG. 5, sidewall 102 of sleeve valve 100 blocks and closes second inlet opening 98. In the noted second position as shown in FIG. 6, sidewall 102 of sleeve valve 100 blocks and closes first inlet opening 68. First inlet opening 68 receives incoming dirty air from channel 30, as noted above, which may include snow-laden air in snowy conditions such as snowplowing. Second inlet opening 98 receives underhood air which is not snow-laden, or at least has far fewer suspended snow particles. During normal operation without snow-laden incoming air in channel 30, it is desired to operate snow valve 100 in the noted first position, as shown in FIG. 5, to provide cool ambient air to the air cleaner from outside of the hood. In snow conditions, the snow valve is switched to the noted second position, as shown in FIG. 6, to draw air into the air cleaner from under the hood. Snow valve 100 in the noted first position of FIG. 5 blocks second inlet 98 such that first inlet 68 is open and second inlet 98 is closed. Snow valve 100 in the noted second position of FIG. 6 blocks first inlet 68 such that second inlet 98 is open and first inlet 68 is closed. In the latter position, FIG. 6, incoming snow-laden air in channel 30 cannot enter filter housing inlet 68, as shown at arrow 106.

Figure 7:
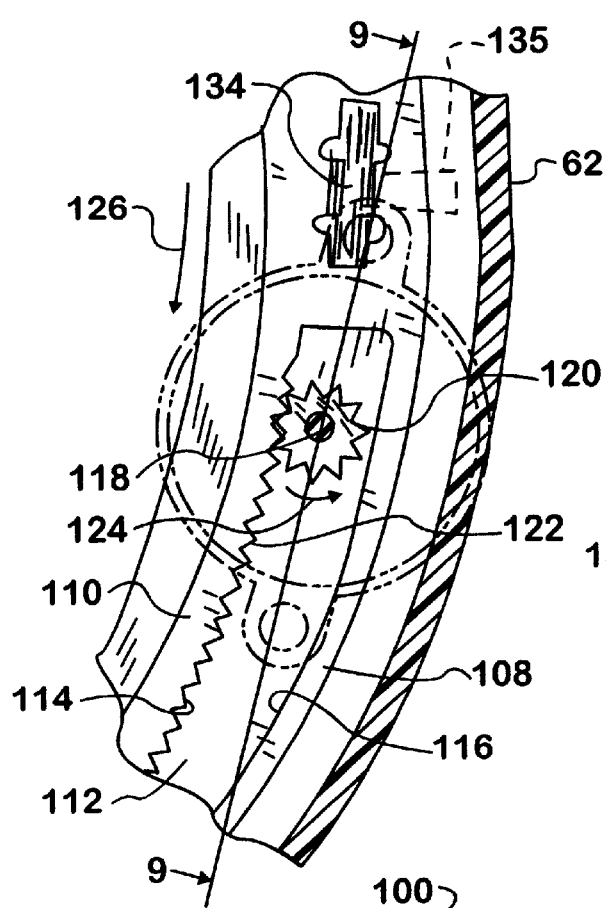
FIG. 7 is an enlarged view of a portion of FIG. 5 at section 7—7.
Figure 8:
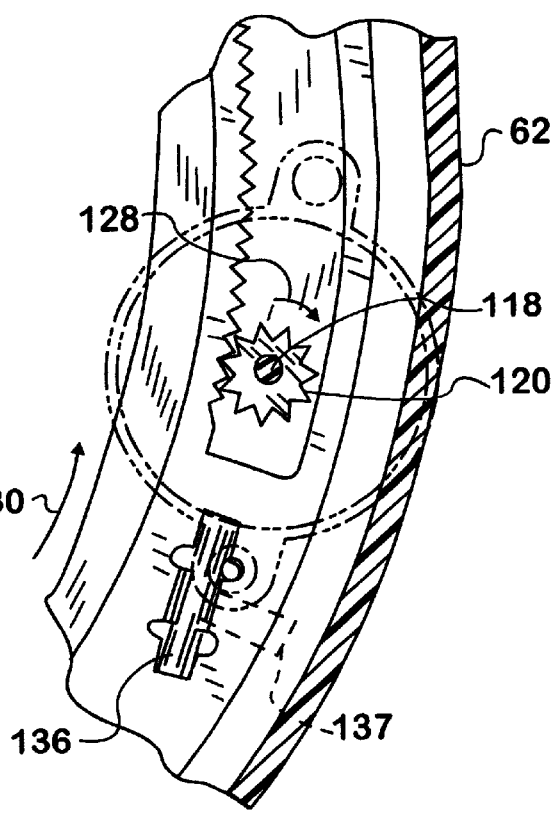
FIG. 8 is a view like FIG. 7 and shows an alternate condition.

Sleeve valve 100 has an outer arcuate wall 108, FIG. 5, and an inner arcuate wall 110 spaced radially inwardly of outer arcuate wall 108 by a radial gap 112. Arcuate opening 104 is in outer arcuate wall 108. Inner arcuate wall 110 subtends a smaller angle about axis 54 than outer arcuate wall 108. Inner arcuate wall 110 is arcuately spaced from and radially non-aligned with arcuate opening 104 in outer arcuate wall 108. Inner arcuate wall 110 has an outer arcuate surface 114, FIG. 7, facing gap 112. Outer arcuate wall 108 has an inner arcuate surface 116 facing gap 112. Outer arcuate surface 114 of inner arcuate wall 110 faces inner arcuate surface 116 of outer arcuate wall 108 radially across gap 112. Rotary actuator 106 has a rotary shaft 118, FIGS. 3, 5, 7, extending axially through housing endwall 64 into gap 112. Shaft 118 has a pinion gear 120 thereon, FIG. 7, in gap 112. Outer arcuate surface 114 of inner arcuate wall 110 has an arcuate gear rack 122 engaged by pinion gear 120 in rack and pinion relation to rotate sleeve valve 100 between the noted first and second positions of FIGS. 5 and 6, respectively, as shown in FIGS. 7 and 8, respectively, in response to rotation of shaft 118. Rotation of shaft 118 counterclockwise in the orientation of FIG. 7 as shown at arrow 124 rotates sleeve valve 100 circumferentially clockwise in the orientation of FIG. 7 as shown at arrow 126 to the position shown in FIG. 7 which is the noted first position of FIG. 5 opening inlet 68 and closing inlet 98. Rotation of shaft 118 clockwise in the orientation of FIG. 8 as shown at arrow 128 circumferentially rotates sleeve valve 100 counterclockwise in the orientation of FIG. 8 as shown at arrow 130 to the position shown in FIG. 8 which is the noted second position shown in FIG. 6 closing inlet 68 and opening inlet 98.

Figure 3:
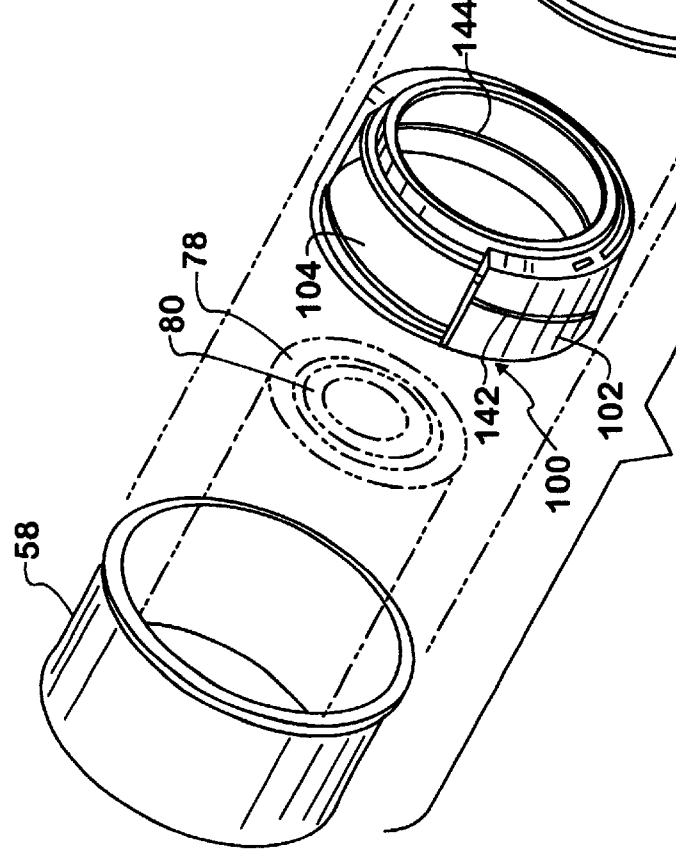
FIG. 3 is an exploded perspective view of the air cleaner of FIG. 2.
Figure 9:
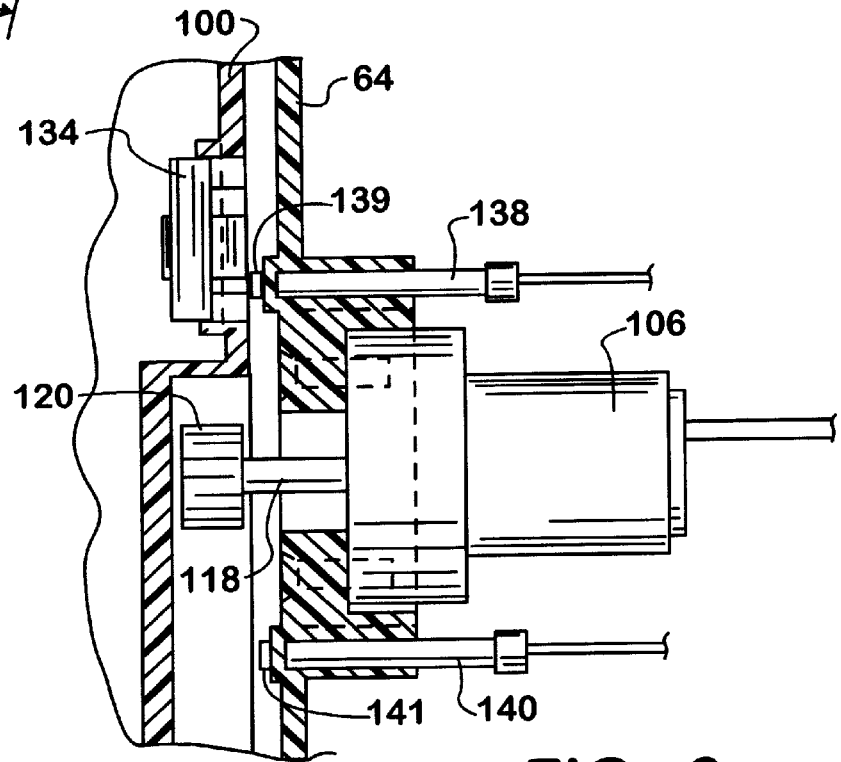
FIG. 9 is a view partly in section taken along line 9—9 of FIG. 7.

Electrical motor 106 is mounted to endwall 64 of the filter housing and is energizable to rotate shaft 118 about an axis 132, FIG. 3, parallel to axis 54. Electric motor 106 is preferably remotely energized by a switch in the vehicle cab, so that the operator need not stop the vehicle, open the hood, and manually switch the snow valve to its alternate or second position. Sleeve valve 100 has first and second magnets 134 and 136, FIGS. 5, 6, 7, 8, circumferentially spaced therealong. First and second switches are provided by proximity sensors 138 and 140, FIGS. 3, 9, mounted to housing endwall 64 to sense proximity of a respective magnet to control energization of electric motor 106. When shaft 118 and pinion gear 120 have rotated sleeve valve 100 to the noted first position shown in FIGS. 7 and 5, magnet 134 moves into the sensing field of proximity sensor 138, and the latter terminates energization of motor 106. When shaft 118 and pinion gear 120 rotate sleeve valve 100 to the noted second position shown in FIGS. 8 and 6, magnet 136 moves into the sensing field of proximity sensor 140, and the latter terminates energization of motor 106. Magnets 134 and 136 are at opposite circumferential ends of inner arcuate wall 110, and are circumferentially spaced from circumferentially opposite ends of gap 112. Proximity sensors 138 and 140 are spaced on opposite circumferential sides of electric motor 106. In a further embodiment, proximity sensors 138 and 140 are replaced by mechanically actuated switches as shown schematically in dashed line at 139 and 141, and magnets 134 and 136 are replaced by actuation fingers as shown schematically in dashed line at 135 and 137, for actuating switches 139 and 141, respectively.

The cylindrical sidewall of sleeve valve 100 includes one or more external and/or internal circumferential reinforcement rings 142, 144, FIG. 3, maintaining cylindrical roundness of the sleeve cylindrical sidewall during operation, including upon heat cycling which occurs in the engine compartment due to the heat of the engine. Filter housing 60 and sleeve valve 100 are preferably plastic, and reinforcement rings 142 and/or 144 are raised plastic beads adding radial thickness for hoop strength. Alternatively, rings 142 and/or 144 may be a metal hoop member bonded, molded or sonically welded to the sleeve valve.

The system provides a method for preventing snow-clogging of an underhood air cleaner 20 in a vehicle in snowy conditions, by operating the snow valve 100 between the noted first and second positions. The system provides a method of changing an incoming air flow path to an air cleaner.

Inlet shroud seal 72, FIGS. 2, 10, is a resilient rubber member self-mounted to the filter housing at inlet 68 and engaging hood 28 at exit opening 36 for directing incoming dirty air from air channel 30 through exit opening 36 into inlet 68 of filter housing 60. Shroud seal 72 is self-mounted to housing 60 without extra parts or fasteners. FIG. 12 shows a shroud seal 150 known in the prior art, and uses like reference numerals from above where appropriate to facilitate understanding. Shroud seal 150 is mounted to filter housing 152 at circular inlet 154 by a circular clamp 156. The construction of the shroud seal 72 and filter housing of FIGS. 10 and 11 eliminates fasteners or extra parts such as 156.

Inlet 68, FIG. 2, of filter housing 60 has a perimeter border 160 having first, second, third and fourth sides 162, 164, 166, 168, respectively. First and second sides 162 and 164 extend arcuately and are axially spaced from each other. Third and fourth sides 166 and 168 are arcuately spaced from each other and extend axially between first and second sides 162 and 164. Resilient shroud seal 72 has a base 170 with a perimeter border 172 having first, second, third and fourth sides 174, 176, 178, 180, respectively. First and second sides 174 and 176 extend arcuately and are axially spaced from each other. Third and fourth sides 178 and 180 are arcuately spaced from each other and extend axially between first and second sides 174 and 176. First, second, third, fourth sides 174, 176, 178, 180, respectively, of perimeter border 172 of base 170 of shroud seal 72 resiliently deformably engage first, second, third, fourth sides 162, 164, 166, 168, respectively, of perimeter border 160 of inlet 68 of housing 60 and are releasably held thereon by first, second, third, fourth detents 182, 184, 186, 188, respectively, FIGS. 10, 11, formed on first, second, third, fourth sides 162, 164, 166, 168, respectively, of perimeter border 160 of inlet 68 of housing 60.

Noted first sides 162 and 174 extend arcuately parallel to each other and along and arcuately parallel to sidewall 62 of housing 60. Second sides 164 and 176 extend arcuately parallel to each other and along endwall 64 of housing 60. Third sides 166 and 178 extend axially parallel to each other and along sidewall 62 of housing 60. Fourth sides 168 and 180 extend axially parallel to each other and along sidewall 62 of housing 60. Second sides 164 and 176 are spaced radially inwardly of sidewall 62. The engagement interface of first sides 162 and 174 defines a first arc. The engagement interface of second sides 164 and 176 defines a second arc. The noted first and second arcs are parallel to each other and subtend the same angle at axis 54. The first arc has a larger radius of curvature than the second arc.

Detents 182, 184, 186, 188 are male detents or projection rails formed along the perimeter border 160 of inlet 68 of housing 60 at respective sides 162, 164, 166, 168. Perimeter border 172 of base 170 of shroud seal 72 has a female receiving channel formed therealong at respective sides 174, 176, 178, 180, as shown at respective receiving channels 190, 192, 194, 196. Each receiving channel 190, 192, 194, 196 resiliently deformably and releasably receives its respective projection rail 182, 184, 186, 188. Rails 182 and 184 include a barb 198, 200, respectively, inserted into its respective channel 190, 192 in snap-fit interlocking relation, with the channel being resiliently deformable to release the barb. Barb 198 extends axially from side 162 of perimeter border 160. Barb 200 extends radially outwardly from side 164 of perimeter border 160 and perpendicularly to barb 198. In this manner, sides 174 and 162 engage each other by axial insertion of barb 198 into channel 190 and are axially retained thereby; and sides 164 and 176 engage each other by radial insertion of barb 200 into channel 192 and are radially retained thereby. Detent barb 198 extends axially from side 162 toward side 164. Detent barb 192 extends radially from side 164 away from axis 54. Male detents 186 and 188 are received in female channels 194 and 196 in interference fit interlocked relation, with such channels being resiliently deformable to release the shroud from the housing. In other embodiments, the roles of the male and female members may be reversed, with the detents formed on the filter housing being female receiving channels, and the perimeter border 172 of the resilient shroud seal having male projection members or rails formed thereon.

Resilient shroud seal 72 has a second perimeter border 210, FIGS. 2, 10, 11, radially outward of perimeter border 172. Perimeter border 210 engages lower panel 34 of hood 28 around exit opening 36. Perimeter border 210 has first, second, third and fourth sides 212, 214, 216, 218, respectively, radially outward of first, second, third, fourth sides 174, 176, 178, 180, respectively, of first inner perimeter border 172 of shroud seal 72. First and second sides 212 and 214 of second perimeter border 210 are parallel to each other and nonparallel to each of first, second, third, fourth sides 174, 176, 178, 180 of first inner perimeter border 172. Third and fourth sides 216 and 218 of second outer perimeter border 210 of shroud seal 72 are parallel to each other and nonparallel to each of first, second, third, fourth sides 174, 176, 178, 180 of first inner perimeter border 172 of shroud seal 72. First, second, third, fourth sides 212, 214, 216, 218 of second outer perimeter border 210 of shroud seal 72 are coplanar and define a plane 220, FIG. 10, nonparallel to axis 54.

The arrangement provides a system and method for self-mounting the inlet shroud seal to the housing without extra parts or fasteners. The system and method includes both axial and radial insertion and retention.

It is recognized that various equivalents, alternatives and modifications are possible within the scope of the appended claims.

What is claimed is:

1. An underhood air cleaner for a vehicle having an internal combustion engine comprising:

a filter housing comprising opposite endwalls, a sidewall disposed between the endwalls, an inlet in the sidewall for receiving air, and an outlet for discharging air;

a resilient shroud seal releasably self-mounted to the housing at the inlet without extra parts or fasteners; and wherein air flows through the inlet shroud seal into the inlet.

2. An underhood air cleaner for a vehicle having an internal combustion engine of claim 1, wherein the shroud seal releasably self-mounts to the housing by matingly engaging the housing.

3. An underhood air cleaner for a vehicle having an internal combustion engine of claim 1, further comprising:

an inlet perimeter border bordering the inlet;

a detent formed on the inlet perimeter border; and a shroud seal base on the shroud seal having a shroud seal border and deformably engaging the inlet perimeter border and held thereon by the detent.

4. An underhood air cleaner for a vehicle having an internal combustion engine of claim 2, further comprising:

first and second sides of the shroud seal border extending arcuately and are axially spaced from each other;

third and fourth sides of the shroud seal border extending axially between the first and second sides and are arcuately spaced from each other; and wherein the sidewall is cylindrical.

5. An underhood air cleaner for a vehicle having an internal combustion engine of claim 4, wherein the first side extends along and arcuately parallel to the sidewall, the second side extends arcuately along one of the endwalls, and the third and fourth sides extend axially along the sidewall.

6. An underhood air cleaner for a vehicle having an internal combustion engine of claim 5, wherein the second side is spaced radially inwardly of the sidewall.

7. An underhood air cleaner for a vehicle having an internal combustion engine of claim 6, wherein the arc of the first side and the arc of the second side are parallel to each other and subtend the same angle at the axis, the arc of the first side having a larger radius of curvature than the arc of the second side.

8. An underhood air cleaner for a vehicle having an internal combustion engine of claim 2, wherein the shroud seal releasably matingly engages the housing by having a female receiving channel releasably and deformably matingly engaging a male projection rail.

9. An underhood air cleaner for a vehicle having an internal combustion engine of claim 8, wherein the male projection rail further comprises;

a barb inserted into the female receiving channel in a snap-fit interlocking relation; and wherein the female receiving channel is resiliently deformable to release the barb.

10. An underhood air cleaner for a vehicle having an internal combustion engine of claim 9, further comprising:

an inlet perimeter border bordering the inlet;

a shroud seal base on the shroud seal having a shroud seal border;

first and second inlet sides of the inlet perimeter border axially spaced from each other;

a first shroud seal side of the shroud seal border matingly engaging the first inlet side, wherein a first barb extends axially from the first inlet side or the first shroud seal side into a respective first channel;

a second shroud seal side of the shroud seal border matingly engaging the second inlet side, wherein a second barb is perpendicular to the first barb and extends radially from the second inlet side or the second shroud seal side into a respective second channel; and wherein the sidewall is cylindrical.

11. An underhood air cleaner for a vehicle having an internal combustion engine of claim 1, further comprising:

a shroud seal base on the shroud seal having a shroud seal border;

first and second inlet sides of the inlet axially spaced from each other, wherein the first inlet side has a first detent extending axially therefrom toward the second inlet side, and the second inlet side has a second detent extending radially therefrom away from the axis;

first and second shroud seal sides of the shroud seal border axially spaced from each other, wherein the first shroud seal side releasably and deformably engages the detent in axially inserted and retained relation and the second shroud seal side releasably and deformably engages the detent in radially inserted and retained relation; and wherein the sidewall is cylindrical.

12. An underhood air cleaner for a vehicle having an internal combustion engine of claim 11, wherein each of the detents is a male detent.

13. An underhood air cleaner for a vehicle having an internal combustion engine of claim 1, further comprising:

a first detent extending axially from the sidewall;

a second detent extending radially from the endwall;

wherein the shroud seal self-mounts to the housing in an axially inserted and axially retained relation along the first detent, and in radially inserted and radially retained relation along the second detent; and wherein the sidewall is cylindrical.

14. An underhood air cleaner for a vehicle having an internal combustion engine of claim 13, wherein the shroud seal is self-mounted to the housing in a resilient, deformable and releasable snap-fit relation.

15. An underhood air cleaner for a vehicle having an internal combustion engine of claim 1, further comprising:

a perimeter inlet border having first, second, third and fourth inlet sides, each inlet side having a detent;

a shroud seal base;

a shroud seal border on the shroud seal base, the shroud seal border having first, second third and fourth shroud seal sides resiliently and deformably engaging the respective first, second, third and fourth inlet sides and held thereon by the detents; and wherein the sidewall is cylindrical.

16. An underhood air cleaner for a vehicle having an internal combustion engine of claim 15, wherein the first and second inlet sides extend arcuately and are axially spaced from each other, the third and fourth inlet sides extend axially and are arcuately spaced from each other, the first and second shroud seal sides extend arcuately and are axially spaced from each other, the third and fourth shroud seal sides extend axially and are arcuately spaced from each other.

17. An underhood air cleaner for a vehicle having an internal combustion engine of claim 16, wherein the first inlet side and first shroud seal side extend arcuately parallel to each other and along the sidewall, the second inlet side and second shroud seal side extend arcuately parallel to each other and along one endwall.

18. An underhood air cleaner for a vehicle having an internal combustion engine of claim 17, wherein the third inlet side and the third shroud seal side extend axially and parallel to each other and along the sidewall, and the fourth inlet side and the fourth shroud seal side extend axially parallel to each other and along the sidewall.

19. An underhood air cleaner for a vehicle having an internal combustion engine of claim 18, wherein the second inlet side and the second shroud seal side are spaced radially inwardly of the sidewall.

20. An underhood air cleaner for a vehicle having an internal combustion engine of claim 19, further comprising:

a first arc being defined by the engagement interface of the first inlet side and the first shroud seal side;

a second arc parallel to and having a smaller radius of curvature than the first arc and being defined by the engagement interface of the second inlet side and the second shroud seal side; and wherein the first and second arcs subtend the same angle at the axis.

21. An underhood air cleaner for a vehicle having an internal combustion engine of claim 15, wherein each of the detents is a male detent.

22. An underhood air cleaner for a vehicle having an internal combustion engine of claim 15, further comprising:

a hood in the vehicle having an air channel with an exit opening;

a second shroud seal perimeter border located radially outward of the first perimeter border adapted to engage the hood at the exit opening;

first, second, third and fourth hood sides of the second shroud seal perimeter border and extending radially outward of the respective first, second, third and fourth shroud seal sides.

23. An underhood air cleaner for a vehicle having an internal combustion engine of claim 22, wherein the first and second hood sides are parallel to each other, the third and fourth hood side are parallel to each other, and each of the hood sides are nonparallel to the first, second, third and fourth shroud seal sides.

24. An underhood air cleaner for a vehicle having an internal combustion engine of claim 23, wherein the first, second, third and fourth hood sides are coplanar and define a plane nonparallel to the axis.

25. A method of mounting an inlet shroud seal to an underhood air cleaner for a vehicle having an internal combustion engine, the method comprising the steps of:

providing a filter housing comprising opposite endwalls, a sidewall disposed between the endwalls, an inlet in the sidewall for receiving air, and an outlet for discharging air;

releasably self-mounting a resilient shroud seal to the housing at the inlet without extra parts or fasteners;

forming a seal between the shroud seal and housing at the inlet without extra parts or fasteners;

maintaining the seal without extra parts or fasteners; and allowing air to flow through the inlet shroud seal into the inlet.

26. A method of mounting an inlet shroud seal to an underhood air cleaner for a vehicle having an internal combustion engine of claim 25, wherein self-mounting the shroud seal further comprises the step of:

snap-fitting the shroud seal onto the housing in a resiliently deformable manner.

27. A method of mounting an inlet shroud seal to an underhood air cleaner for a vehicle having an internal combustion engine of claim 25, wherein self-mounting the shroud seal further comprises the steps of:

providing a first detent extending axially from the sidewall;

providing a second detent extending radially from the endwall;

axially inserting the first detent into the shroud seal;

radially inserting the second detent into the shroud seal; and axially and radially retaining the shroud seal with the detents.

28. A method of filtering air in a vehicle having an internal combustion engine, the method comprising the steps of:

providing a hood in the vehicle with an air channel;

providing a filter housing comprising opposite endwalls, a cylindrical sidewall disposed between the endwalls, an inlet in the sidewall, and an outlet;

providing an air filter within the housing;

releasably self-mounting a resilient shroud seal to the housing at the inlet without extra parts or fasteners;

releasably self-mounting the resilient shroud seal to the hood at the air channel without extra parts or fasteners;

forming a seal between the shroud seal and housing at the inlet without extra parts or fasteners;

maintaining the seal without extra parts or fasteners;

allowing dirty air to flow from the air channel into the inlet shroud seal;

allowing dirty air to flow through the inlet shroud seal into the housing through the inlet;

allowing dirty air to flow into the air filter;

filtering the dirty air with the air filter;

removing the filtered air from the housing through the outlet.

29. A method of filtering air in a vehicle having an internal combustion engine of claim 28, wherein self-mounting the shroud seal further comprises the step of:

snap-fitting the shroud seal onto the housing in a resiliently deformable manner.

30. A method of filtering air in a vehicle having an internal combustion engine of claim 28, wherein self-mounting the shroud seal further comprises the steps of:

providing a first detent extending axially from the sidewall;

providing a second detent extending radially form the endwall;

axially inserting the first detent into the shroud seal;

radially inserting the second detent into the shroud seal; and axially and radially retaining the shroud seal with the detents.

* * * * *